US009625652B1

(12) United States Patent
Yasumura

(10) Patent No.: US 9,625,652 B1
(45) Date of Patent: Apr. 18, 2017

(54) MEMS MIRROR ARRAYS HAVING MULTIPLE MIRROR UNITS

(71) Applicant: Google Inc., Mountain View, CA (US)

(72) Inventor: Kevin Yasumura, Lafayette, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/062,717

(22) Filed: Mar. 7, 2016

Related U.S. Application Data

(63) Continuation of application No. 14/209,312, filed on Mar. 13, 2014, now Pat. No. 9,304,259.

(51) Int. Cl.
*G02B 6/26* (2006.01)
*G02B 6/35* (2006.01)

(52) U.S. Cl.
CPC ........... *G02B 6/3518* (2013.01); *G02B 6/356* (2013.01); *G02B 6/3556* (2013.01)

(58) Field of Classification Search
CPC .................................................. G02B 6/3584
See application file for complete search history.

(56) References Cited

U.S. PATENT DOCUMENTS

| | | |
|---|---|---|
| 6,289,145 B1 | 9/2001 | Solgaard et al. |
| 6,330,102 B1 | 12/2001 | Daneman et al. |
| 6,456,751 B1 | 9/2002 | Bowers et al. |
| 6,480,319 B2 | 11/2002 | Daneman et al. |
| 6,587,611 B1 | 7/2003 | Hunt |
| 6,657,771 B2 | 12/2003 | Okayama |
| 6,900,922 B2 | 5/2005 | Aubuchon |
| 7,042,609 B2 | 5/2006 | Buzzetta |
| 7,488,082 B2 * | 2/2009 | Kim ................ G02B 26/0841 359/292 |
| 2004/0165249 A1 | 8/2004 | Aubuchon |
| 2005/0264870 A1 * | 12/2005 | Kim ..................... G02B 3/00 359/298 |

FOREIGN PATENT DOCUMENTS

EP    1102096    3/2005

OTHER PUBLICATIONS

Aksyuk et al., 'Beam-Steering Micromirrors for Large Optical Cross-Connects,' Journal of Lightwave Technology, 21(3):634-642 IEEE Mar. 2003, 9 pages.
Dadap et al., 'Modular MEMS-Based Optical Cross-Connect With Large Port-Count,' IEEE Photonics Technology Letters, 15(12):1773-1775, Dec. 2003, 3 pages.

* cited by examiner

*Primary Examiner* — Sung Pak
(74) *Attorney, Agent, or Firm* — Fish & Richardson P.C.

(57) ABSTRACT

A micro-electro-mechanical systems (MEMS) mirror array can be constructed using sub-dies that each includes two or more MEMS mirrors. In some implementations, an optical cross-connect system includes a first MEMS mirror array that includes first mirror units. Each first mirror unit can include a first substrate and two or more first MEMS mirrors supported by the first substrate. Each first substrate can be independent from each other first substrate. The cross-connect system can include a second MEMS mirror array that includes second mirror units. Each second mirror unit can include a second substrate and two or more second MEMS mirrors supported by the second substrate. Each second substrate can be independent from each other second substrate.

20 Claims, 5 Drawing Sheets

MEMS MIRROR ARRAYS HAVING MULTIPLE MIRROR UNITS

CROSS-REFERENCE TO RELATED APPLICATIONS

This application is a continuation application of, and claims priority to, U.S. patent application Ser. No. 14/209,312, titled "MEMS MIRROR ARRAYS HAVING MULTIPLE MIRROR UNITS," filed on Mar. 13, 2014. The disclosure of the foregoing application is incorporated herein by reference in its entirety for all purposes.

BACKGROUND

Optical cross-connect systems are used to switch optical signals in fiber optic networks. Optical cross-connect systems typically include mirrors for redirecting input optical signals from input fibers to output fibers. For example, some optical connect systems include an array of micro-electromechanical systems (MEMS) mirrors for reflecting input optical signals onto another array of MEMS mirrors that, in turn, reflect the optical signals onto the output fibers. The mirrors can be rotated using actuators to align the optical signals onto the appropriate fibers.

As optical cross-connect system sizes increase, monolithic MEMS arrays become less practical due to typical yield losses (e.g., caused by non-functioning or under-rotating mirrors or non-functioning collimators). For example, a mirror array for a 1024×1024 unit (1024 inputs and 1024 outputs) would need to be 32×32 (total 1024 mirrors) per MEMS die if there was no yield loss. To account for yield loss, the mirror array would likely be designed as a 36×36 mirror array (1296 mirrors). Due to aperture size of the mirrors (up to ~1 millimeter (mm) in diameter) and their center-to-center pitch (typically ~1 mm), a mirror can consume about 2 mm of linear length on each side of the array per mirror. A 150 mm or 200 mm diameter wafer could only support one 72 mm×72 mm die.

SUMMARY

This specification describes technologies relating to MEMS mirror arrays.

In general, one innovative aspect of the subject matter described in this specification can be implemented in an optical cross-connect system that includes a first MEMS mirror array that includes first mirror units, each first mirror unit including a first substrate and two or more first MEMS mirrors supported by the first substrate, each first substrate being independent from each other first substrate; and a second MEMS mirror array that includes second mirror units, each second mirror unit including a second substrate and two or more second MEMS mirrors supported by the second substrate, each second substrate being independent from each other second substrate.

These and other implementations can each optionally include one or more of the following features. In some implementations, an optical cross-connect system can include: an input collimator unit that includes input collimators, the input collimators arranged in two or more separate input collimator bundles; and an output collimator unit that includes output collimators, the output collimators arranged in two or more separate output collimator bundles, where the first MEMS mirror array and the second MEMS mirror array are arranged to reflect photons received from the input collimators of the input collimator unit to output collimators of the output collimator unit. The input collimator unit can include a respective input collimator for each first MEMS mirror. The output collimator unit can include a respective output collimator for each second MEMS mirror.

In some aspects, each first mirror unit includes a same number of first MEMS mirrors as each other first mirror unit. In some aspects, at least one first mirror unit includes a different number of first MEMS mirrors than another first mirror unit.

In some aspects, the first mirror units includes one or more interior mirror units and one or more exterior mirror units disposed around the one or more interior mirror units.

The first MEMS mirrors of the one or more exterior mirror units can have a greater angular rotation range than the first MEMS mirrors of the one or more interior mirror units. Each interior mirror unit can include a greater number of first MEMS mirrors than each exterior mirror unit.

In some aspects, the input collimator unit includes a particular input collimator bundle for each first mirror unit. The particular input collimator bundle for a particular first mirror unit can include an input collimator for each MEMS mirror of the particular first mirror unit.

In some aspects, the output collimator unit includes a particular output collimator bundle for each second mirror unit. The particular output collimator bundle for a particular second mirror unit can include an output collimator for each MEMS mirror of the particular second mirror unit.

In general, another aspect of the subject matter described in this specification can be implemented in a system that includes one or more interior mirror units, that each include: a first substrate; and two or more first MEMS mirrors supported by the first substrate, each first MEMS mirror being rotatable along a respective angular rotation range; and one or more exterior mirror units disposed around the one or more interior mirror units, each exterior mirror unit including: a second substrate that is independent from the first substrate; and two or more second MEMS mirrors supported by the second substrate, each second MEMS mirror being rotatable along a respective angular rotation range; wherein the respective angular rotation range of at least one second MEMS mirror is greater than the respective angular rotation range of at least one first MEMS mirror, and wherein the first mirror unit and the second mirror unit are supported by a common third substrate that is independent from the first substrate and the second substrate.

These and other implementations can each optionally include one or more of the following features. In some aspects, each interior mirror unit includes a same number of first MEMS mirrors as each other interior mirror unit. In some aspects, at least one interior mirror unit includes a different number of first MEMS mirror units than another interior mirror unit.

In some aspects, each exterior mirror unit includes a same number of second MEMS mirrors as each other exterior mirror unit. In some aspects, at least one exterior mirror unit includes a different number of second MEMS mirror units than another exterior mirror unit. In some aspects, at least one interior mirror unit was selected to be positioned as an interior mirror unit in response to determining that the respective rotation range of at least one first MEMS mirror of the at least one interior mirror unit did not meet a threshold rotation range.

In some aspects, the system includes a collimator unit that includes a collimator for each first MEMS mirror and a collimator for each second MEMS mirror. The collimator unit can include a collimator bundle for each interior mirror unit. The collimator bundle for a particular interior mirror unit can include a collimator for each first MEMS mirror of the particular interior mirror unit. The collimator unit can include a collimator bundle for each exterior mirror unit. The collimator bundle for a particular exterior mirror unit can include a collimator for each second MEMS mirror of the particular exterior mirror unit.

In general, another aspect of the subject matter described in this specification can be implemented in methods that include the actions of receiving, from a set of input collimators, photons at a first MEMS mirror array that includes first mirror units, each first mirror unit including a first substrate and two or more first MEMS mirrors supported by the first substrate, each first substrate being independent from each other first substrate; reflecting the photons from the MEMS mirrors of the first MEMS mirror array to a second MEMS mirror array, the second MEM mirror array including second mirror units, each second mirror unit including a second substrate and two or more second MEMS mirrors supported by the second substrate, each second substrate being independent from each other second substrate; and reflecting the photons from the second MEMS mirrors of the second MEMS array to a set of output collimators.

These and other implementations can each optionally include one or more of the following features. Aspects can include receiving, from optical fibers, the photons to the set of input collimators, the input collimators being arranged in two or more bundles, each particular bundle including a subset of input collimators for a particular first mirror unit. Aspects can include providing, to optical fibers, the photons from the set of output collimators, the output collimators being arranged in two or more bundles, each particular bundle including a subset of output collimators for a particular second mirror unit.

Particular aspects of the subject matter described in this specification can be implemented so as to realize one or more of the following advantages. The overall size of a MEMS mirror array can be made smaller by using sub-die with MEMS mirrors installed thereon. By reducing the size of the MEMS mirror arrays, the angular rotation of the MEMS mirrors may be reduced. The complexity of actuators used to rotate the MEMS mirrors can be reduced and the performance of the actuators can be improved by reducing the range of rotation of the MEMS mirrors. Less wafer space is wasted on nonfunctioning mirrors. Test time for individual dies can be decreased due to the decreased number of mirrors per die. Materials can be conserved by arranging dies having mirrors with a less than optical range of rotation in the interior of a MEMS mirror array rather than discarding the die. The yield of optical cross-connects can also be improved by using bundles or groups of collimators.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An optical cross-connect system can include a MEMS mirror array made of multiple mirror units. Each mirror unit can include a substrate, or sub-die, with one or more MEMS mirrors supported thereby. For example, a mirror unit may include sixteen MEMS mirrors arranged in four rows with four MEMS mirrors in each row (4×4 arrangement). A 256 mirror array can be constructed with four rows of 4×4 mirror units. As described below, many other arrangements of mirrors and mirror units are possible.

The yield of the MEMS mirror arrays can be improved and the size of the MEMS mirror arrays can be reduced by constructing the arrays from smaller mirror units. For example, rather than testing a large die having many mirrors and using the die if it has a particular yield, smaller sub-dies can be fabricated and tested. The smaller sub-dies that have sufficient performance (e.g., sufficient yield) can then be used to construct a larger MEMS mirror array. In addition, the layout of the sub-dies within a MEMS mirror array can be determined based on the performance of the mirrors on the sub-dies. For example, sub-dies that have mirrors with insufficient angular rotation may not be located on the outer perimeter of the MEMS mirror array. Instead, the sub-dies may be located in the interior where the range of angular rotation may be smaller, rather than being discarded.

Figure 1:
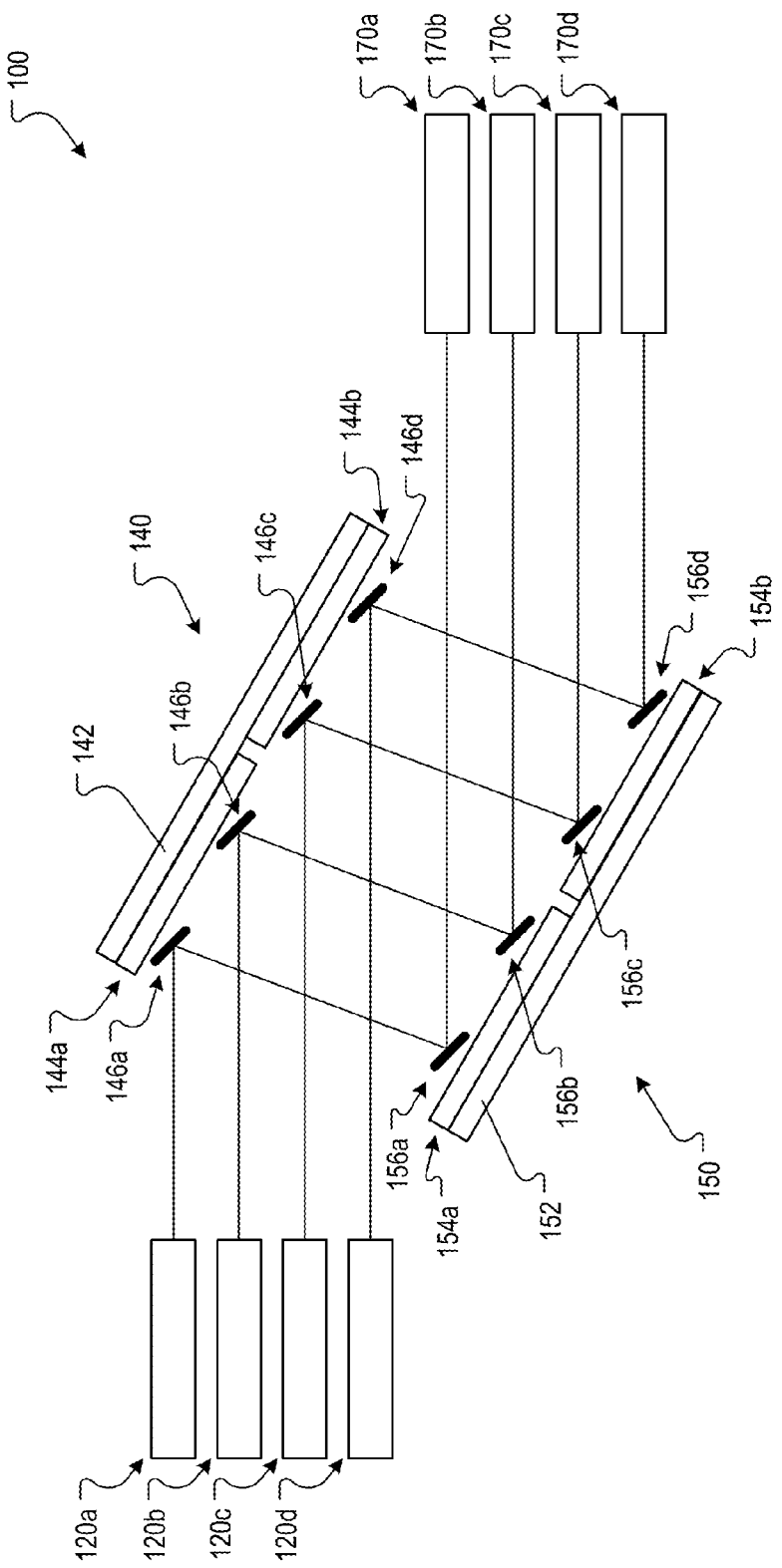
FIG. 1 is a block diagram of an example optical cross-connect system.

FIG. 1 is a block diagram of an example optical cross-connect system 100. The optical cross-connect system 100 can be used to switch optical signals, for example, from one circuit to another in a fiber optic network. The example optical cross-connect system 100 includes a set of input collimators 120a-120d, two MEMS mirror arrays 140 and 150, and a set of output collimators 170a-170d. The relative dimensions depicted are illustrative only and not necessarily to scale.

Each input collimator 120a-120d can align respective input optical signals, e.g., optical pulses, photons, or beams of light, toward a mirror of the input MEMS mirror array 140. In particular, the collimator 120a aligns optical signals toward a MEMS mirror 146a; the collimator 120b aligns optical signals toward a MEMS mirror 146b; the collimator 120c aligns optical signals toward a MEMS mirror 146c; and the collimator 120d aligns optical signals toward a MEMS mirror 146d. A misaligned optical signal may not be reflected appropriately by the MEMS mirrors 146a-146d.

Each collimator 120a-120d can include a lens for aligning its respective optical signals. In some implementations, the input collimators 120a-120d are configured to attach to optical fibers. For example, each input collimator 120a-120d may be attached to a respective optical fiber for receiving optical signals from the optical fiber. In some implementations, the input collimators 120-120d may be configured as one or more bundles or arrays of collimators. The bundles of input collimators 120a-120d can be connected to or otherwise arranged to receive and align optical signals received from optical fibers.

The MEMS mirror array 140 includes MEMS mirrors 146a-146d. Each MEMS mirror 142a-146d can have a round (or other appropriate shape) reflective surface. The diameter of the MEMS mirrors 146a-146d can vary, for example, based on the optical configuration of the optical cross-connect system 100. For example, the diameter of a MEMS mirror may range from several hundred micrometers to over a millimeter. Each MEMS mirror 146a-146d can be rotated about one or more axes (e.g., two axes) to guide the optical signal to a corresponding MEMS mirror on the MEMS mirror array 150. The MEMS mirror array 140 can include, for each MEMS mirror 146a-146d, an actuator that rotates the MEMS mirror 146a-146d. For example, the MEMS mirror array 140 may include a parallel-plate actuator or a comb-drive style actuator (e.g., a vertical comb-drive actuator) for each MEMS mirror 146a-146d.

The MEMS mirrors 146a-146d of the MEMS mirror array 140 are fabricated on, built on, or otherwise installed on or supported by mirror units 144a and 144b. Each mirror unit 144a and 144b can include two or more MEMS mirrors (and their actuators) installed on or supported by a substrate or sub-die. For example, the MEMS mirrors 146a and 146b can be fabricated on a substrate of the mirror unit 144a and the MEMS mirrors 146c and 146d can be fabricated on a substrate of the mirror unit 144b. The substrate of the mirror unit 144a can be independent from the substrate of the mirror unit 144b. For example, the substrate of the mirror unit 144a may be separate from the substrate of the mirror unit 144b.

Figure 2:
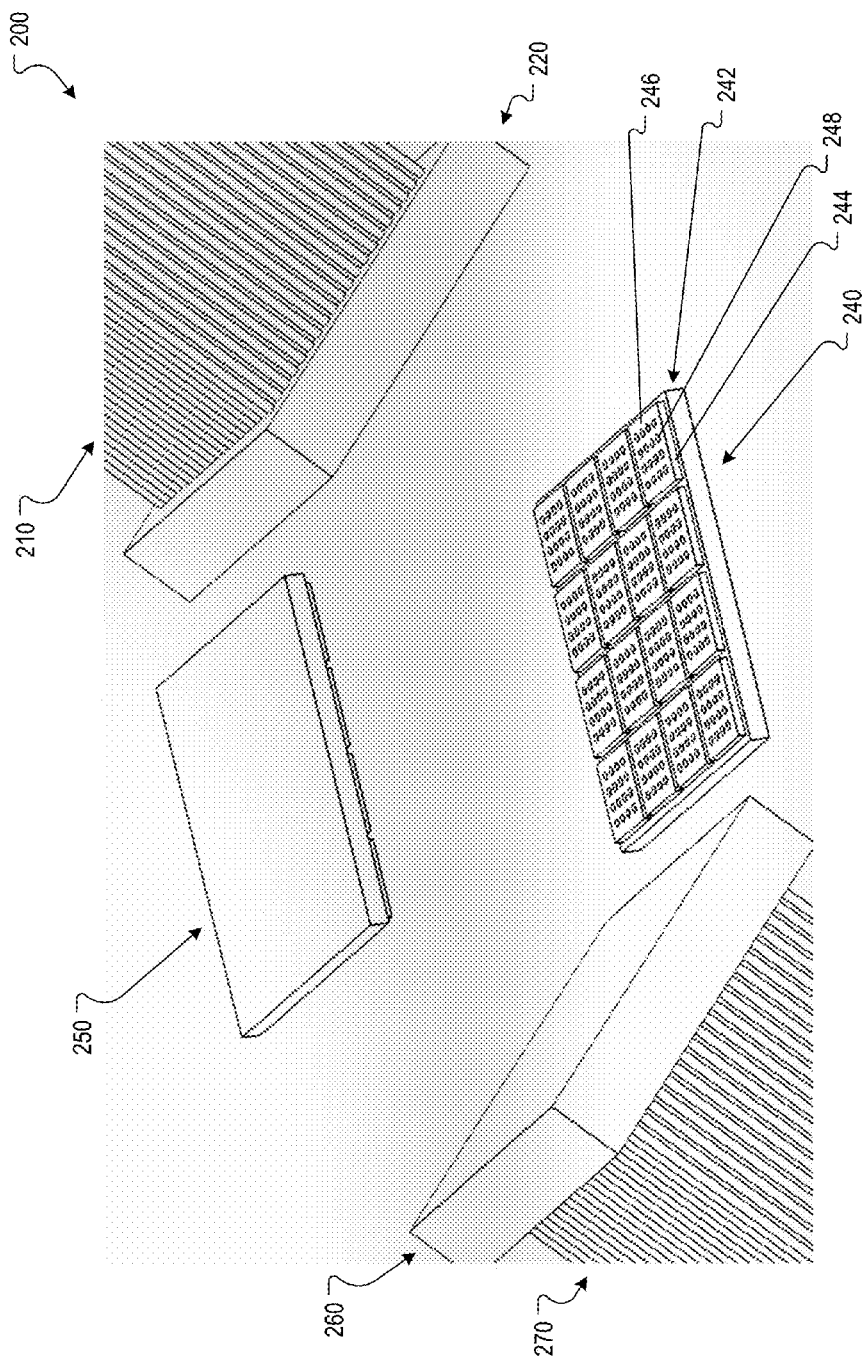
FIG. 2 is a perspective view of an example optical cross-connect system.
Figure 3:
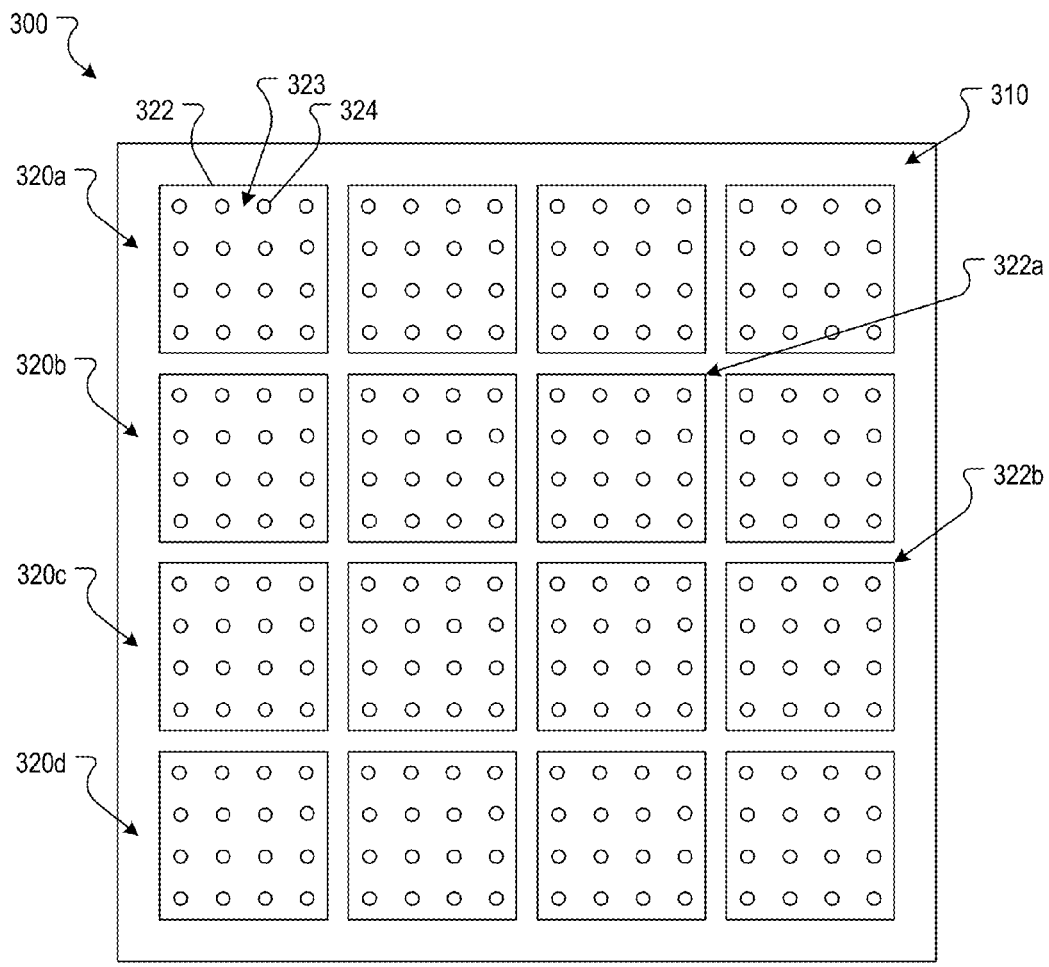
FIG. 3 is a block diagram of an example MEMS mirror array that includes sub-dies with MEMS mirrors.
Figure 4:
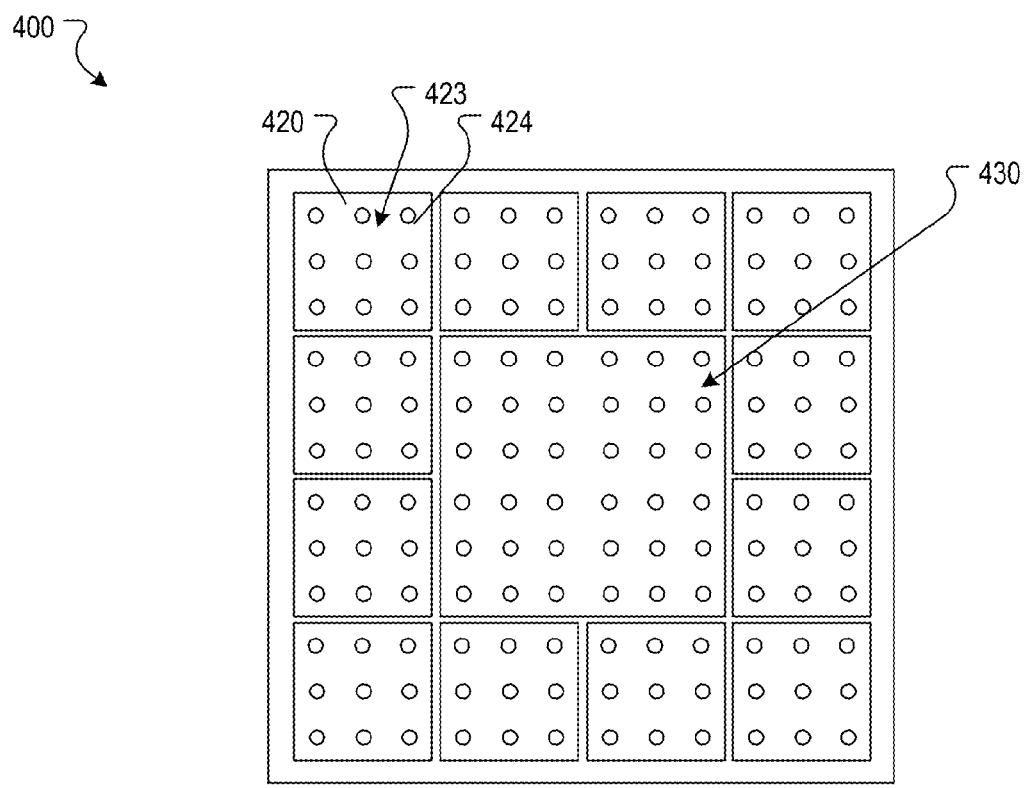
FIG. 4 is a block diagram of another example MEMS mirror array that includes sub-dies with MEMS mirrors.

The mirror units 144a and 144b can be installed on or otherwise supported by a common surface 142, e.g., of another substrate. The surface 142 may be made from a ceramic, e.g., a high temperature co-fired ceramic (HTCC) substrate, a low temperature co-fired ceramic (LTCC) substrate, an alumina-based substrate, a silicon substrate, a polymide-based substrate, or other appropriate materials. Although the example MEMS mirror array 140 is illustrated as having two mirror units 144a and 144b that each have two MEMS mirrors 146a-146d, other arrangements are possible. For example, the MEMS mirror array 140 may have a square or rectangular shaped array of mirror units (e.g., a 4×4, 6×6, or 8×8 array) in which each mirror unit includes two or more MEMS mirrors. Some example MEMS mirror arrangements are illustrated in FIGS. 2-4 and described below.

The MEMS mirror array 150 can be similar to, or the same as, the MEMS mirror array 140. The MEMS mirror 150 includes MEMS mirrors 156a-156d that reflect optical signals received from the MEMS mirrors 146a-146d to output collimators 170a-170d. Each of the MEMS mirrors 156a-156d can be rotated, for example along one or more axes, by an actuator to guide the optical signals to the appropriate output collimator 170a-170c. The MEMS mirrors 156a-156d are fabricated on mirror units 154a and 154b. For example, the MEMS mirrors 156a and 156b are fabricated on a substrate of the mirror unit 154a and the MEMS mirrors 156c and 156d are fabricated on a substrate of the mirror unit 154b. The mirror units 154a and 154b can be installed on a common surface 152, e.g., of another substrate.

The output collimators 170a-170d align the optical signals received from the MEMS mirrors 156a-156d and provide the aligned optical signals to optical fibers. Each output collimator 170a-170d can include a lens for aligning its respective optical signals. In some implementations, the output collimators 170a-170d are configured to attach to optical fibers. For example, each output collimator 170a-170d may be attached to a respective optical fiber for sending optical signals to the optical fiber. In some implementations, the output collimators 170a-170d may be configured as one or more bundles or arrays of collimators. The bundles of output collimators 170a-170d can be connected to or otherwise arranged to align and send optical signals to optical fibers.

Although four input collimators 120a-120d, four input MEMS mirrors 146a-146c, four output MEMS mirrors 156a-156d, and four output collimators 170a-170d are illustrated in FIG. 1, the example optical cross-connect system 100 can include other appropriate numbers of each component. For example, a 128 port optical cross-connect system may include 128 input collimators, 128 input MEMS mirrors, 128 output MEMS mirrors, and 128 output collimators, one of each component for each port. In some implementations, the optical cross-connect system 100 includes more MEMS mirrors (input and/or output) and/or more collimators (input and/or output) than ports to account for any non-functioning components. For example, a 128 port optical cross-connect system may include 144 input and output collimators and 144 input and output MEMS mirrors.

In some implementations, the collimators 120a-120d and 170a-170d may be arranged in multiple collimator bundles. For example, the input collimators 120a-120d may be arranged in bundles based on the arrangement of the mirror units 154a and 154b. The optical cross-connect system 100 may include a collimator bundle for each mirror unit 154a and 154b. For example, the optical cross-connect system 110 may include a collimator bundle that includes the input collimators 120a and 120b for the mirror unit 154a and a collimator bundle that includes the input collimators 120c and 120d for the mirror unit 154b. The collimator bundles may be self-contained bundles that are manufactured separately from each other and replaceable separately from each other.

FIG. 2 is a perspective view of an example optical cross-connect system 200. The example optical cross-connect system 200 includes an input fiber array 210, an input collimator unit 220, an input MEMS mirror array 240, an output MEMS mirror array 250, an output collimator unit 260, and an output fiber array 270. The relative dimensions depicted are illustrative only and not necessarily to scale.

The example optical cross-connect system 200 can include any appropriate number of ports, such as 128, 256, or more or less. The collimator units 220 and 260 can be configured to receive an optical fiber for each port. For example, a collimator unit for a 128 port optical cross-connect system may be configured to attach to a 128 fiber array. Each collimator unit 220 and 260 can include a collimator for each port of the optical cross-connect system 200. In some implementations, the collimator units 220 and 260 may include additional collimators in excess of the number of ports, for example, in case one or more of the collimators fail.

The collimators of the input collimator unit 220 can each align optical signals received from a corresponding optical fiber of the input fiber array 210 towards a corresponding MEMS mirror 248 of the input MEMS mirror array 240. Similarly, the collimators of the output collimator unit 260 can each align optical signals received from a corresponding MEMS mirror of the output MEMS mirror array 250 towards a corresponding optical fiber of the output fiber array 270.

The MEMS mirror arrays 240 and 250 include MEMS mirrors for reflecting optical signals received from the input collimator unit 220 to the output collimator unit 260 as shown by the example optical signal path 230. Each MEMS mirror array 240 and 250 can include a MEMS mirror for each port of the optical cross-connect system 200 and optionally one or more additional mirrors to account for the failure of a mirror.

The MEMS mirror arrays 240 and 250 can include multiple mirror units. For example, the MEMS mirror array 240 includes sixteen mirror units 244 arranged in four rows of four mirror units 244. Each mirror unit 244 can include a sub-die made of a substrate and two or more MEMS mirrors 248 built or fabricated on a surface 246 of the sub-die. The sub-die of each individual mirror unit 244 of the MEMS mirror array 240 can be installed on a common substrate 242, e.g., an HTCC substrate, an LTCC substrate, an alumina-based substrate, a silicon substrate, a polymide-based substrate, or other appropriate material, to form the MEMS mirror array.

The mirror units can be arranged in various configurations for each MEMS mirror array 240 and 250. In one example, each MEMS mirror array 240 and 250 can be shaped as a rectangle or a square and include multiple rectangular or square-shaped mirror units arranged in one or more rows. For example, the MEMS mirror array 240 includes four rows of mirror units 244 with four square-shaped mirror units 244 in each row, forming a square-shaped array. Each mirror unit 244 includes sixteen MEMS mirrors 248 arranged in four rows along its sub-die. In another example, a MEMS mirror array may include three rows of mirror units with three square-shaped mirror units in each row. The output MEMS mirror array 250 may be arranged the same as, similar to, or differently than the input MEMS mirror array 240. Example MEMS mirror arrays are illustrated in FIGS. 3 and 4, and described below.

In some implementations, the input collimator unit 220 and/or the output collimator unit 260 are formed from multiple groups of collimators. In this way, the yield of the collimators can be improved similar to the yield of the MEMS mirrors. The collimators for an optical cross-connect system 200 may be grouped to match the configuration of the MEMS mirrors of the optical cross-connect system 200. For example, if the input MEMS mirror array 240 includes sixteen mirror units 244 having sixteen MEMS mirrors on each mirror unit 244, the input collimator unit 220 may also include sixteen bundles of collimators having sixteen collimators each (e.g., each collimator unit may include a collimator for each MEMS mirror of the mirror unit). Each input collimator bundle can align optical signals to mirrors of the input collimator bundle's corresponding mirror unit. Similarly, each output collimator bundle can receive optical signals from mirrors of the output collimator bundle's corresponding mirror unit.

The collimators may be grouped differently than the MEMS mirrors of the optical cross-connect system 200. For example, the input collimator unit 220 may include four bundles of collimators with 64 collimators in each bundle. Or, the input collimator unit 220 may include a single bundle of 256 collimators. Many other configurations are possible.

Each group of collimators may be a self-contained unit separate from each other bundle of collimators. For example, the collimators of a particular bundle may be attached or connected to each other. The individual collimator bundles may then be installed in a collimator unit. For example, each collimator unit may be separately installed in and replaced in a collimator unit. In this way, individual bundles of collimators can be replaced if one or more collimators of the bundle fail.

FIG. 3 is a block diagram of example MEMS mirror array 300 that includes sub-dies with MEMS mirrors. The example MEMS mirror array 300 can be used in the example optical cross-connect systems 100 and 200 illustrated in FIGS. 1 and 2, and described above. For example, the MEMS mirror arrays 140 and 150 of FIG. 1 and/or the MEMS mirror arrays 240 and 250 of FIG. 2 may include a MEMS mirror array that is the same as, or similar to, the MEMS mirror array 300. The relative dimensions depicted are illustrative only and not necessarily to scale.

The example MEMS mirror array 300 includes four rows 320a-320d of mirror units 322 and each row includes four mirror units 322. Each mirror unit 322 includes four rows of four MEMS mirrors fabricated on a sub-die 323. Thus, the example MEMS mirror array 300 includes 256 MEMS mirrors 324 fabricated on 16 individual mirror units 322. Other appropriate arrangements are also possible for a 256 mirror array and/or for other sized mirror arrays. For example, a 36 mirror array may include three rows of three mirror units that each includes four MEMS mirrors. By way of another example, a 1024 mirror array may include eight rows of eight mirror units that each includes 16 mirrors.

Each mirror unit 322 can be attached to, or otherwise installed on, a common substrate 310 (e.g., a ceramic substrate). For example, the mirror units 322 may be attached to the common substrate 310 using adhesive or eutectic die attachment methods. Although the mirror units 322 are illustrated as being spaced apart, the mirror units 322 can be arranged such that adjacent mirror units touch each other to maximize substrate space utilization.

Each MEMS mirror 324 can have a round (or other appropriate shape) reflective surface with an appropriate diameter, e.g., of several hundred micrometers, about one millimeter, or more than one millimeter. The MEMS mirrors 324 can be spaced apart from adjacent MEMS mirrors 324 on a mirror unit 322. For example, the MEMS mirrors 324 may be spaced apart from adjacent MEMS mirrors by about two millimeters (or some other appropriate distance) from the center of the MEMS mirror 324 to the center of the adjacent MEMS mirrors 324. The distance between MEMS mirrors 324 may vary, for example, based on the design of the optical cross-connect system or other device for which the MEMS mirrors 324 are being fabricated. In addition, the distance between MEMS mirrors 324 can vary on the mirror unit 322. For example, the MEMS mirrors 324 may be spaced further apart in one direction (e.g., from lefty to right in FIG. 3) along the surface of the substrate 310 than in a different direction (e.g., from top to bottom in FIG. 3) along the surface of the substrate 310.

A collimator unit that aligns optical signals towards, or receives optical signals from, the example MEMS mirror array 300 may include 16 bundles of collimators and each bundle may include 16 collimators. The collimator bundles may be arranged similar to the arrangement of the mirrors of the MEMS mirror array 300. For example, the 16 collimator bundles may be arranged in four rows of four collimator bundles each such that each mirror unit 322 has a corresponding collimator bundle. The collimator unit may have a corresponding collimator bundle for mirror unit 322a. The corresponding collimator bundle may have 16 collimators arranged, for example, in four rows with four collimators in each row. Similarly, the collimator unit may have a corresponding collimator bundle for the mirror unit 322b and each other mirror unit 322 of the MEMS mirror array 300.

Although the example MEMS mirrors 324 and mirror units 322 are arranged in recti-linear arrays, other arrangements are possible. For example, the MEMS mirrors 324 of one or more of the mirror units 322 may be close-packed in a hex-like arrangement.

FIG. 4 is a block diagram of another example MEMS mirror array 400 that includes sub-dies with MEMS mirrors. The example MEMS mirror array 400 can be used in the example optical cross-connect systems 100 and 200 illustrated in FIGS. 1 and 2, and described above. For example, the MEMS mirror arrays 140 and 150 of FIG. 1 and/or the MEMS mirror arrays 240 and 250 of FIG. 2 may include a MEMS mirror array that is the same as, or similar to, the MEMS mirror array 400. The relative dimensions depicted are illustrative only and not necessarily to scale.

The MEMS mirror array 400 includes twelve mirror units 420 arranged along the exterior of the MEMS mirror array 400 and a mirror unit 430 arranged in the interior of the MEMS mirror array 400. As shown in FIG. 4, the interior mirror unit 430 is larger and includes more mirrors 424 than the exterior mirror units 422. In particular, the exterior mirror units 420 include nine MEMS mirrors fabricated on a sub-die 423 and the interior mirror unit 430 includes 36 MEMS mirrors fabricated on a sub-die 423.

In other implementations, the exterior mirror units 420 may be larger and include more MEMS mirrors 424 than the interior mirror unit 430. In addition, other implementations may include more than one interior mirror units having a different size and a different number of MEMS mirrors than one or more exterior mirror units.

A collimator unit that aligns optical signals towards, or receives optical signals from, the example MEMS mirror array 400 may include 13 bundles of collimators. For example, the collimator unit may include a collimator bundle for each exterior mirror unit 420 and a collimator bundle for the interior mirror unit 430. The collimator bundle for each exterior mirror unit 420 may include nine collimators arranged in three rows similar to the MEMS mirrors 424 of the exterior mirror units 420. Similarly, the collimator bundle for the interior mirror unit 430 may include 36 collimators arranged in six rows similar to the MEMS mirrors 424 of the interior mirror unit 430.

In an optical cross-connect system, the mirrors located closer to the center of the mirror array (e.g., mirrors located in the interior of a mirror array) often do not need as great of a range of angular rotation to properly guide optical signals as mirrors located further from the center of the mirror array (e.g., mirrors located along the exterior of the array). For example, it may be beneficial for the MEMS mirrors 424 of the exterior mirror units 420 to have a greater range of rotation than the MEMS mirrors 424 of the interior mirror unit 430 as the exterior mirror units 420 are further from the center of the MEMS mirror array 400 than the interior mirror unit 430. Therefore, mirror units having mirrors that do no rotate fully may be located in the interior of the MEMS mirror array. In addition, as the risk of MEMS mirrors being unusable in the interior of a MEMS mirror array is less than that of the exterior, mirror units that are to be located in the interior may be larger and include more MEMS mirrors than mirror units that are to be located along the exterior of the MEMS mirror array.

The MEMS mirrors of each mirror unit may be tested after fabrication to determine whether the mirrors have a sufficient range of angular rotation (e.g., the range of rotation of the mirror meets or exceeds a threshold). Due to under-etching or stiffness of the die, some mirrors may not rotate sufficiently. If a mirror unit has one or more mirrors that do not rotate sufficiently, the mirror unit may not be arranged along the exterior of a MEMS mirror array. However, if the mirror has a sufficient range of angular rotation for use in the interior of the MEMS mirror array, it may be arranged in the interior rather than be discarded. For example, the mirror unit 322a of FIG. 3 may include one or more MEMS mirrors that do not rotate sufficiently to be placed along the exterior of the MEMS mirror array 300. Thus, the mirror unit 322a is located in the interior of the MEMS mirror array 300.

Figure 5:
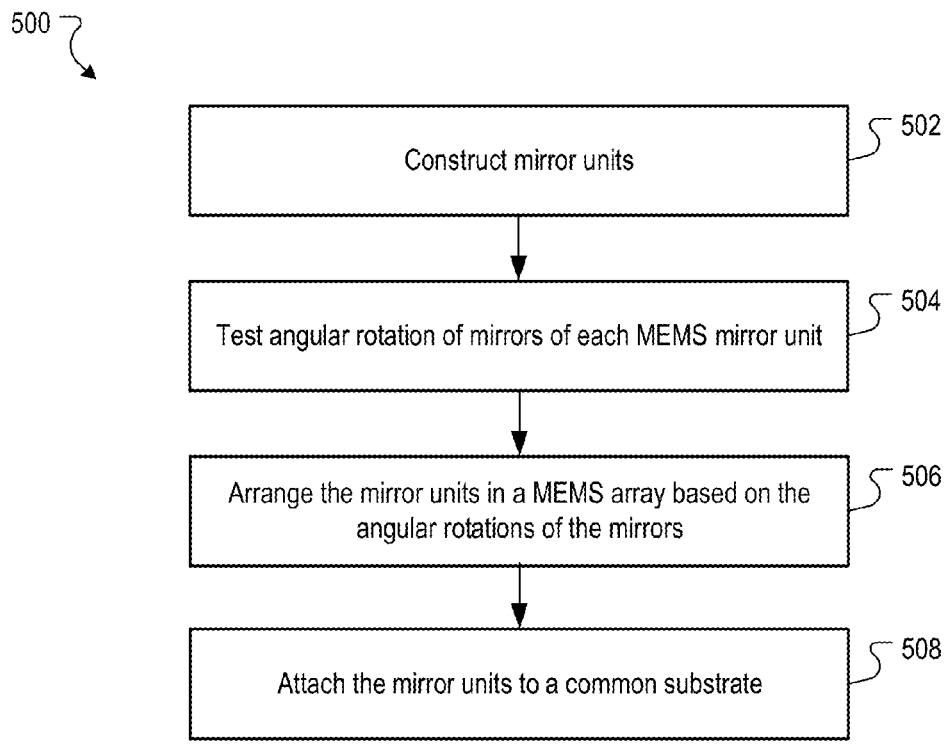
FIG. 5 is a flow chart of an example process for arranging MEMS mirrors in a MEMS mirror array.

FIG. 5 is a flow chart of an example process 500 for arranging MEMS mirrors in a MEMS mirror array. In block 502, mirror units that include MEMS mirrors are constructed. A mirror unit may be constructed by fabricating two or more MEMS mirrors on a sub-die. For example, the two or more mirrors and their corresponding actuators may be micro-machined on a sub-die.

In block 504, the angular rotation of each mirror of unit is tested. A mirror may be tested by rotating the mirrors in each direction using the mirror's actuator and measuring the rotation of the mirror in each direction.

In block 506, the mirror units are arranged in a MEMS mirror array based on the angular rotation of the mirror units' mirrors. For example, mirror units in which all of its mirrors rotate sufficiently (e.g., at least a threshold amount in one or more directions or along one or more axes) may be located on the exterior of a MEMS mirror array. Mirror units that have one or more mirrors that do not rotate sufficiently may also be located on the exterior of the MEMS mirror array. For example, MEMS mirror units that have at least a threshold number of mirrors that rotate sufficiently may be located on the exterior of the MEMS mirror array.

Mirror units that are not eligible for the exterior may be considered for the interior of the MEMS mirror array. For example, a mirror unit may be located in the interior of the MEMS mirror array if at least a threshold number of MEMS mirrors of the mirror unit rotate sufficiently (e.g., at least a threshold amount in one or more directions or along one or more axes) to be located in the interior of the MEMS mirror array.

For some MEMS mirror arrays, there may also be intermediate mirror units disposed between the interior mirror units and the exterior mirror units. A mirror unit may be located in the intermediate area between the interior and exterior mirror units if at least a threshold number of mirrors of the mirror unit rotate sufficiently (e.g., at least a threshold amount in one or more directions or along one or more axes) to be located in the intermediate area.

In some implementations, the direction of rotation may also be considered when determining where to arrange mirror units in the MEMS mirror array. For example, mirrors on a particular side of the MEMS mirror array may have a greater rotation demand in a particular direction than in other directions. A mirror unit that has one or more mirrors that do not rotate fully, but do rotate sufficiently in the particular direction, may be located on the particular side of the MEMS mirror array.

In block 510, the mirror units are attached to a common substrate according to the arrangement. For example, each mirror unit may be attached to the common substrate using adhesive or eutectic die attachment methods.

Figure 6:
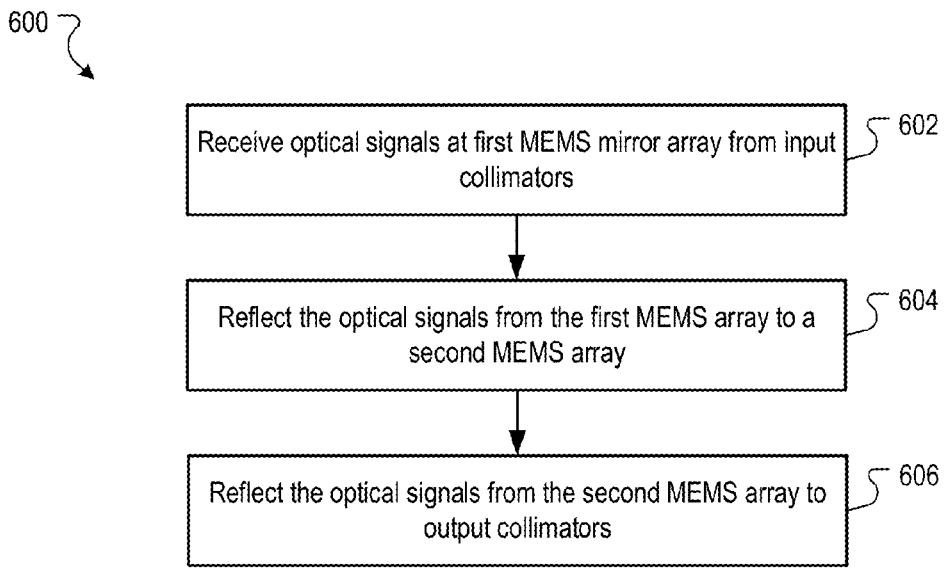
FIG. 6 is a flow chart of an example process for reflecting optical signals using MEMS mirror arrays.

FIG. 6 is a flow chart of an example process 600 for reflecting optical signals using MEMS mirror arrays. In block 602, optical signals are received at a first MEMS mirror array from input collimators. For example, MEMS mirrors of the first MEMS mirror array may receive an optical signal from a corresponding input collimator. The MEMS mirrors may be arranged on multiple mirror units as described above. Similarly, the input collimators may be grouped in multiple bundles that correspond to the arrangement of MEMS mirrors of the first MEMS mirror array.

In block 604, the MEMS mirrors of the first MEMS mirror array reflect the received optical signals to corresponding MEMS mirrors of a second MEMs mirror array. Each MEMS mirror of the first MEMS mirror array may be rotated (e.g., about one or more axes using an actuator) to direct its optical signal to its corresponding MEMS mirrors of the second MEMS mirror array. The second MEMS mirror array may be arranged on multiple mirror units, similar to that of the first MEMS mirror array.

In block 606, the MEMS mirrors of the second MEMS mirror array reflect the optical signals received from the first MEMS mirror array to output collimators. For example, each MEMS mirror of the second MEMS mirror array may reflect a received optical signal to a corresponding output collimator. The MEMS mirrors of the second MEMS mirror array may be rotated (e.g., about one or more axes using an actuator) to direct its optical signal to its corresponding output collimator. The output collimators may be grouped in multiple bundles that correspond to the arrangement of MEMS mirrors of the second MEMS mirror array.

Implementations of the subject matter and the operations described in this specification can be implemented in digital electronic circuitry, or in computer software, firmware, or hardware, including the structures disclosed in this specification and their structural equivalents, or in combinations of one or more of them.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An optical cross-connect system, comprising:
   a first micro-electro-mechanical (MEMS) mirror array that includes:
      one or more first interior mirror units, each first interior mirror unit comprising a first substrate and a plurality of MEMS mirrors supported by the first substrate; and
      a plurality of first exterior mirror units that surround the one or more first interior mirror units, each first exterior mirror unit comprising a second substrate and one or more MEMS mirrors supported by the second substrate, wherein each first interior mirror unit includes a greater number of MEMS mirrors than each first exterior mirror unit; and
   a second MEMS mirror array that includes:
      one or more second interior mirror units, each second interior mirror unit comprising a third substrate and a plurality of MEMS mirrors supported by the third substrate; and
      a plurality of second exterior mirror units that surround the one or more second interior mirror units, each second exterior mirror unit comprising a fourth substrate and one or more MEMS mirrors supported by the fourth substrate, wherein each second interior mirror unit includes a greater number of MEMS mirrors than each second exterior mirror unit.

2. The optical cross-connect system of claim 1, wherein the first MEMS mirror array and the second MEMS mirror array are arranged such that each MEMS mirror of the first MEMS mirror array reflects light towards a corresponding MEMS mirror of the second MEMS mirror array.

3. The optical cross-connect system of claim 1, wherein each MEMS mirror of each first exterior mirror unit has an angular rotation that meets a specified threshold rotation range.

4. The optical cross-connect system of claim 3, wherein at least one MEMS mirror of each first interior mirror unit has an angular rotation that does not meet the specified threshold rotation range.

5. The optical cross-connect system of claim 1, wherein:
   at least a threshold number of MEMS mirror of each first exterior mirror unit has an angular rotation that meets a specified threshold rotation range; and
   at least one MEMS mirror of each first interior mirror unit has an angular rotation that does not meet the specified threshold rotation range.

6. The optical cross-connect system of claim 1, wherein the first substrate of each first interior mirror unit has a surface area that is larger than a surface area of the second substrate of each first exterior mirror unit.

7. The optical cross-connect system of claim 1, further comprising:
   an input collimator unit that includes a plurality of input collimators, the input collimators arranged in two or more separate input collimator bundles; and
   an output collimator unit that includes a plurality of output collimators, the output collimators arranged in two or more separate output collimator bundles,
   wherein the first MEMS mirror array and the second MEMS mirror array are arranged to reflect light received from the input collimators of the input collimator unit to the output collimators of the output collimator unit.

8. The optical cross-connect system of claim 7, wherein:
   the input collimator unit includes a particular input collimator bundle for each first interior mirror unit and for each first exterior mirror unit;
   the particular input collimator bundle for a particular first interior mirror unit includes an input collimator for each MEMS mirror of the particular first interior mirror unit; and
   the particular input collimator bundle for a particular first exterior mirror unit includes an input collimator for each MEMS mirror of the particular first exterior mirror unit.

9. The optical cross-connect system of claim 8, wherein:
the output collimator unit includes a particular output collimator bundle for each second interior mirror unit and for each second exterior mirror unit;
the particular output collimator bundle for a particular second interior mirror unit includes an output collimator for each MEMS mirror of the particular second interior mirror unit; and
the particular output collimator bundle for a particular second exterior mirror unit includes an output collimator for each MEMS mirror of the particular second exterior mirror unit.

10. An apparatus, comprising:
one or more interior mirror units, each interior mirror unit comprising a first substrate and a plurality of MEMS mirrors supported by the first substrate; and
a plurality of exterior mirror units that surround the one or more interior mirror units, each exterior mirror unit comprising a second substrate and one or more MEMS mirrors supported by the second substrate, wherein each interior mirror unit includes a greater number of MEMS mirrors than each exterior mirror unit.

11. The apparatus of claim 10, wherein each MEMS mirror of each exterior mirror unit has an angular rotation that meets a specified threshold rotation range.

12. The apparatus of claim 11, wherein at least one MEMS mirror of each interior mirror unit has an angular rotation that does not meet the specified threshold rotation range.

13. The apparatus of claim 10, wherein:
at least a threshold number of MEMS mirror of each exterior mirror unit has an angular rotation that meets a specified threshold rotation range; and
at least one MEMS mirror of each interior mirror unit has an angular rotation that does not meet the specified threshold rotation range.

14. The apparatus of claim 10, wherein the first substrate of each interior mirror unit has a surface area that is larger than a surface area of the second substrate of each exterior mirror unit.

15. A method, comprising:
receiving, from a set of input collimators, photons at a first micro-electro-mechanical systems (MEMS) mirror array that includes:
one or more first interior mirror units, each first interior mirror unit comprising a first substrate and a plurality of MEMS mirrors supported by the first substrate; and
a plurality of first exterior mirror units that surround the one or more first interior mirror units, each first exterior mirror unit comprising a second substrate and one or more MEMS mirrors supported by the second substrate, wherein each first interior mirror unit includes a greater number of MEMS mirrors than each first exterior mirror unit;
reflecting the photons from the MEMS mirrors of the first MEMS mirror array to a second MEMS mirror array, the second MEM mirror array including:
one or more second interior mirror units, each second interior mirror unit comprising a third substrate and a plurality of MEMS mirrors supported by the third substrate; and
a plurality of second exterior mirror units that surround the one or more second interior mirror units, each second exterior mirror unit comprising a fourth substrate and one or more MEMS mirrors supported by the fourth substrate, wherein each second interior mirror unit includes a greater number of MEMS mirrors than each second exterior mirror unit;
reflecting the photons from the second MEMS mirrors of the second MEMS array to a set of output collimators.

16. The method of claim 15, further comprising receiving, from optical fibers, the photons at the set of input collimators, the input collimators being arranged in two or more bundles, each particular bundle including a subset of input collimators for a particular first interior mirror unit or a particular first exterior mirror unit.

17. The method of claim 15, further comprising providing, to optical fibers, the photons from the set of output collimators, the output collimators being arranged in two or more bundles, each particular bundle including a subset of output collimators for a particular second interior mirror unit or a particular second exterior mirror unit.

18. The method of claim 15, wherein each MEMS mirror of each first exterior mirror unit has an angular rotation that meets a specified threshold rotation range.

19. The method of claim 18, wherein at least one MEMS mirror of each first interior mirror unit has an angular rotation that does not meet the specified threshold rotation range.

20. The method of claim 15, wherein the first substrate of each first interior mirror unit has a surface area that is larger than a surface area of the second substrate of each first exterior mirror unit.

* * * * *